US008620258B2

(12) United States Patent
Harris

(10) Patent No.: US 8,620,258 B2
(45) Date of Patent: Dec. 31, 2013

(54) WIRELESS SERVICE UPGRADE ENABLEMENT

(75) Inventor: John Harris, Glenview, IL (US)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/451,932

(22) Filed: Apr. 20, 2012

(65) Prior Publication Data

US 2013/0281065 A1 Oct. 24, 2013

(51) Int. Cl.
*H04M 11/00* (2006.01)
(52) U.S. Cl.
USPC .......................... 455/405; 455/414.1; 455/446
(58) Field of Classification Search
USPC .............. 455/405, 411, 418, 423, 446, 414.1; 370/230, 315; 705/34, 26.2, 37; 709/201
See application file for complete search history.

(56) References Cited

U.S. PATENT DOCUMENTS

| | | | |
|---|---|---|---|
| 6,128,599 A | 10/2000 | Walker et al. | 705/14 |
| 6,269,343 B1 * | 7/2001 | Pallakoff | 705/26.2 |
| 8,306,518 B1 * | 11/2012 | Gailloux et al. | 455/418 |
| 2005/0054324 A1 * | 3/2005 | Chmaytelli et al. | 455/405 |
| 2005/0083840 A1 * | 4/2005 | Wilson | 370/230 |
| 2006/0069619 A1 | 3/2006 | Walker et al. | 705/14 |
| 2006/0143098 A1 * | 6/2006 | Lazaridis | 705/34 |
| 2008/0097857 A1 | 4/2008 | Walker et al. | 705/14 |
| 2010/0287103 A1 | 11/2010 | Mason | 705/80 |
| 2010/0311444 A1 * | 12/2010 | Shi et al. | 455/466 |
| 2011/0294499 A1 * | 12/2011 | Vikberg et al. | 455/423 |
| 2012/0231785 A1 * | 9/2012 | Poon et al. | 455/423 |
| 2012/0278378 A1 * | 11/2012 | Lehane et al. | 709/201 |
| 2012/0287844 A1 * | 11/2012 | Ophir et al. | 370/315 |
| 2013/0023235 A1 * | 1/2013 | Fan et al. | 455/411 |
| 2013/0040697 A1 * | 2/2013 | Ekici et al. | 455/552.1 |

FOREIGN PATENT DOCUMENTS

| | | |
|---|---|---|
| EP | 1105813 | 6/2011 |
| WO | WO 9923596 | 5/1999 |
| WO | WO-00/79456 | 12/2000 |
| WO | WO-2007/117606 | 10/2007 |
| WO | WO 2011/161555 | 12/2011 |

OTHER PUBLICATIONS

Ajoy Singh; U.S. Appl. No. 13/228,544, filed Sep. 9, 2011, "Application performance improvement in radio networks".

* cited by examiner

*Primary Examiner* — San Htun
*Assistant Examiner* — Nathan Taylor
(74) *Attorney, Agent, or Firm* — Harrington & Smith

(57) ABSTRACT

A method includes selecting user equipment based at least on tracked information related to a wireless service in a geographic region, and messaging the selected user equipment to offer upgraded wireless service relative to a current wireless service. The offer for the upgraded wireless service is contingent on users of the user equipment meeting criteria. In response to the one or more users of the user equipment meeting the criteria, performing one or more of the following: indicating to a new operator that contracts for wireless service for users of the user equipment may be transferred from current operators to a new operator; or transmitting to the user equipment a commitment to deploy new wireless infrastructure to provide, within a specific time interval, coverage over of the geographic region; or indicating to corresponding current operators that contracts for wireless service for users associated with the user equipment should be updated.

16 Claims, 5 Drawing Sheets

WIRELESS SERVICE UPGRADE ENABLEMENT

TECHNICAL FIELD

This invention relates generally to wireless networks and, more specifically, relates to upgrading the wireless networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

| | |
|---|---|
| ACK | Acknowledge |
| AP | Access Point |
| AWT | Alternate Wireless Technology |
| CN | Core Network |
| CPC | Computer Program Code |
| eNB | evolved Node B (e.g., LTE base station) |
| GPS | Global Positioning System |
| IP | Internet Protocol |
| LTE | Long Term Evolution |
| OS | Operating System |
| RAN | Radio Access Network |
| TCP | Transmission Control Protocol |
| UE | User Equipment (e.g., a wireless device) |

Currently, third-party companies which identify and rent locations for deploying wireless access points or cellular towers often follow a person-intensive approach. This typically entails identifying a problem area, e.g., by examining drop call statistics. Then, a person is assigned to personally investigate and look for a location in an identified problem geographic area.

Small cells are increasingly being used, e.g., to increase capacity in certain areas. AWT typically involves adding additional access points within a macro cell coverage area that "underlay" the macro cell. The additional access points have smaller coverage than the macro cell, but can provide, e.g., additional capacity within that smaller coverage.

With small cells, the number of sites increases dramatically and each site has a smaller footprint (e.g., relative to a macro cell). Consequently, because of the increased volume of cell sites, the inefficiencies of the previous system need to be placed under greater scrutiny. Additionally, greater amounts of data are now available for data mining, which can potentially be leveraged to improve efficiency in dealing with this problem. However, upgrading cellular throughput such as by deploying additional underlay cells is an additional cost to the operator, but is not generally tightly linked to additional revenue or overall profit.

There is a need for a mechanism which enables the operator to automatically identify essentially zero risk or definitely profitable scenarios or locations for deployment of additional underlay access points.

SUMMARY

This section contains examples of possible implementations and is not meant to be limiting.

In an exemplary embodiment, a method is disclosed that includes selecting one or more user equipment based at least on tracked information related to quality of a wireless service for user equipment in a geographic region, and messaging the selected one or more user equipment to offer at least upgraded wireless service relative to a current wireless service for the user equipment in the geographic region. The offer for the upgraded wireless service is contingent on one or more users of the one or more user equipment meeting one or more criteria. The method includes, in response to the one or more users of the one or more user equipment meeting the one or more criteria, performing one or more of the following: indicating to a new operator that contracts for wireless service for users associated with the one or more user equipment may be transferred from the corresponding one or more current operators to the new operator; or transmitting to the one or more user equipment a commitment to deploy new wireless infrastructure to provide, within a specific time interval, coverage over at least a portion of the geographic region; or indicating to corresponding one or more current operators that one or more contracts for wireless service for users associated with the one or more user equipment should be updated.

In another exemplary embodiment, a computer program product is disclosed including a computer-readable storage medium bearing computer program code embodied therein for use with a computer, the computer program code comprising: code for selecting one or more user equipment based at least on tracked information related to quality of a wireless service for user equipment in a geographic region; code for messaging the selected one or more user equipment to offer at least upgraded wireless service relative to a current wireless service for the user equipment in the geographic region, wherein the offer for the upgraded wireless service is contingent on one or more users of the one or more user equipment meeting one or more criteria; code, responsive to the one or more users of the one or more user equipment meeting the one or more criteria, for performing one or more of the following: indicating to a new operator that contracts for wireless service for users associated with the one or more user equipment may be transferred from the corresponding one or more current operators to the new operator; or transmitting to the one or more user equipment a commitment to deploy new wireless infrastructure to provide, within a specific time interval, coverage over at least a portion of the geographic region; or indicating to corresponding one or more current operators that one or more contracts for wireless service for users associated with the one or more user equipment should be updated.

In a further exemplary embodiment, an apparatus includes: means for selecting one or more user equipment based at least on tracked information related to quality of a wireless service for user equipment in a geographic region; means for messaging the selected one or more user equipment to offer at least upgraded wireless service relative to a current wireless service for the user equipment in the geographic region, wherein the offer for the upgraded wireless service is contingent on one or more users of the one or more user equipment meeting one or more criteria; and means, responsive to the one or more users of the one or more user equipment meeting the one or more criteria, for performing one or more of the following: indicating to a new operator that contracts for wireless service for users associated with the one or more user equipment may be transferred from the corresponding one or more current operators to the new operator; or transmitting to the one or more user equipment a commitment to deploy new wireless infrastructure to provide, within a specific time interval, coverage over at least a portion of the geographic region; or indicating to corresponding one or more current operators that one or more contracts for wireless service for users associated with the one or more user equipment should be updated.

In an additional exemplary embodiment, an apparatus is disclosed that includes one or more processors and one or more memories including computer program code. The one or more memories and the computer program code are configured, with the one or more processors, to cause the apparatus to perform: selecting one or more user equipment based at least on tracked information related to quality of a wireless service for user equipment in a geographic region; messaging the selected one or more user equipment to offer at least upgraded wireless service relative to a current wireless service for the user equipment in the geographic region, wherein the offer for the upgraded wireless service is contingent on one or more users of the one or more user equipment meeting one or more criteria; and in response to the one or more users of the one or more user equipment meeting the one or more criteria, performing one or more of the following: indicating to a new operator that contracts for wireless service for users associated with the one or more user equipment may be transferred from the corresponding one or more current operators to the new operator; or transmitting to the one or more user equipment a commitment to deploy new wireless infrastructure to provide, within a specific time interval, coverage over at least a portion of the geographic region; or indicating to corresponding one or more current operators that one or more contracts for wireless service for users associated with the one or more user equipment should be updated.

DETAILED DESCRIPTION OF THE DRAWINGS

As stated above, there is a need for a mechanism to enable an operator of a wireless service to automatically identify, with limited or essentially zero risk or definitely profitable scenarios or locations for deployment of additional underlay access points. Exemplary embodiments herein provide this mechanism. An overview is presented now, and additional details are presented below after a description of exemplary systems. In an exemplary embodiment, a wireless service upgrade enabling application is disclosed wherein messaging is conveyed to users meeting specific criteria. Information about users, such as wireless messaging usage or throughput, or battery drain or battery life, may be collected and correlated with a certain geographical region. For those users meeting certain criteria, messaging is communicated to the users offering upgrades for wireless service (e.g., connectivity) in that geographical region. The offered upgrades may relate to the user, e.g., another operator has better wireless service in that area. The offered upgrades may lead to an improvement of wireless service for that user and other users. For instance, if a certain number of users agree to switch to a specific operator, the specific operator will have a known financial impetus to improve the wireless service in that geographical region. Additional examples follow the description of exemplary systems.

Figure 1:
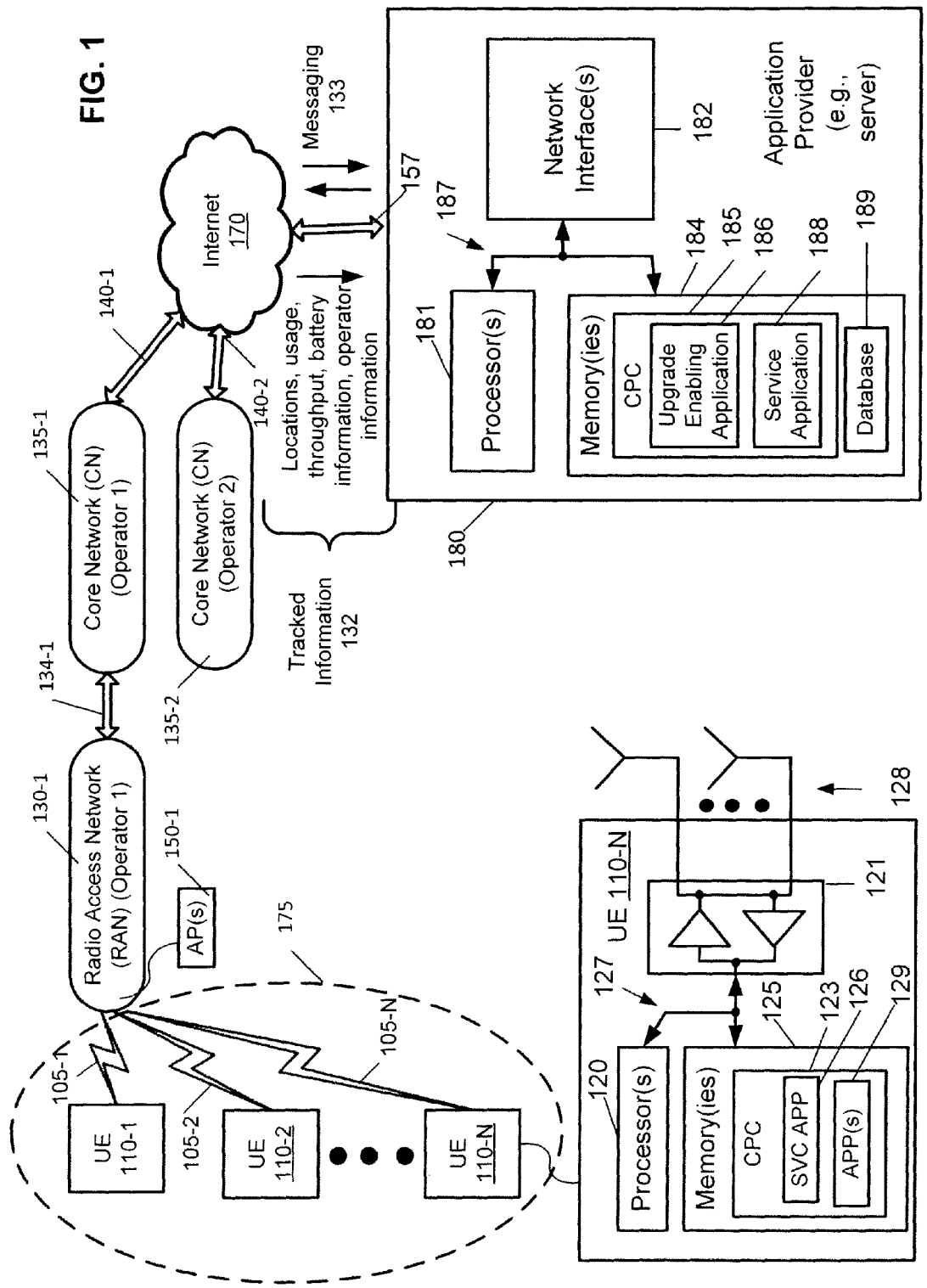
FIG. 1 illustrates a block diagram of an exemplary system in which the instant invention may be used.

Turning to FIG. 1, this figure illustrates a block diagram of an exemplary system in which the instant invention may be used. In FIG. 1, N UEs 110-1 through 110-N are in wireless communication via corresponding wireless links 105 with one or more APs 150-1 that are part of a radio access network (RAN) 130-1, operated by Operator 1. These access points may be eNBs (evolved Node Bs, e.g., base stations for LTE, long term evolution, networks). These UEs 110 are in the geographical region 175. A block diagram of a UE 110-N is shown in FIG. 1, and it is assumed other UEs are similar. The UE 110-N includes one or more processors 120, one or more memories 125, and one or more transceivers 121, interconnected through one or more buses 127. The term "buses" should be construed broadly, to cover, e.g., wired, wireless, optical, and other communication systems. The one or more transceivers 121 are coupled to one or more antennas 128. The one or more memories 125 include computer program code (CPC) 123, comprising in this example a service application (SVC APP) 123, and one or more additional applications (APP(s)) 129. The one or more memories 125 and the computer program code 123 are configured, with the one or more processors 120, to cause the apparatus to perform the operations described herein.

An operator network (for Operator 1) includes the RAN 130-1 and also the core network (CN) 135-1, which are interconnected through link 134-1. The CN 135-1 is coupled to the Internet 170 via the link 140-1. In this example, another operator network for Operator 2 is shown including the CN 135-2, which is coupled to the Internet 170 via the link 140-2. Operator 2 does not have a RAN or AP to this specific geographical region 175.

The application provider 180 includes one or more processors 180, one or more memories 184, and one or more network interfaces 182, interconnected through one or more buses 187. The term "buses" should be construed broadly, to cover, e.g., wired, wireless, optical, and other communication systems. The one or more network interfaces 180 can communicate via the link 157 with the Internet 170 or other networks. The one or more memories 184 include computer program code (CPC) 185, comprising in this example an upgrade enabling application 186 and a service application 188. A database 189 is stored in the one or more memories 184. The one or more memories 184 and the computer program code 185 are configured, with the one or more processors 181, to cause the apparatus to perform the operations described herein.

In a conventional system, the service applications 126 and 188 communicate together to provide some type of service to the user of the UEs 110. For instance, the service may be Groupon, which is a service that provides users with reduced prices for local daily deals. During a normal course of events, the client service application 126 (e.g., an "app") on the user equipment 110 communicates with the server service application 188 on the application provider 180, e.g., to send and receive application data such as coupons. In an exemplary embodiment herein, the service application 126 passes certain tracked information 132, such as (but not limited to) user locations, user usage, user throughput, battery information, and operator information to the upgrade enabling application 186, which could be part of the service application 188 but is shown separate for ease of exposition. The service application 126 may collect and use the tracked information. For instance, a service application like Groupon will often automatically have access to location information for users. Other tracked information 132 will be provided to the service application 126 by the one or more other applications 129, which could include operating system applications. For example, battery drain and battery life may be provided by an application 129. Another possibility for application 129 is a network-monitoring application, such as NetMeter, which monitors network traffic. Information from the network-monitoring application (e.g., and position from a GPS in the user equipment 110) may be communicated as tracked information 132 to the client service application 126, which can then communicate the information to the server service application 188.

The upgrade enabling application 186 uses the tracked information 132, through techniques described in detail below, to select users in the geographical region 175 to which messaging 133 should be sent and received. The messaging offers, e.g., upgraded wireless service(s) to the selected users, as is described below. The upgrade enabling application 186 can store the tracked information 132 in the database 189, e.g., in order to subsequently mine the database 189 to determine users meeting certain criteria, such as being within the geographical region 175.

The computer readable memories 125 and 184 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125 and 184 may implement a computer readable storage medium, as part of a program product, and may be used to contain code for performing operations. The processors 120 and 181 may be of any type suitable to the local technical environment, and may include one or more of general purpose computers, special purpose computers, microprocessors, digital signal processors (DSPs), integrated circuits and/or programmable logic, and processors based on a multi-core processor architecture, as non-limiting examples.

In general, the various embodiments of the UE 110 may include, but are not limited to, smart phones, cellular mobile devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Figure 2:
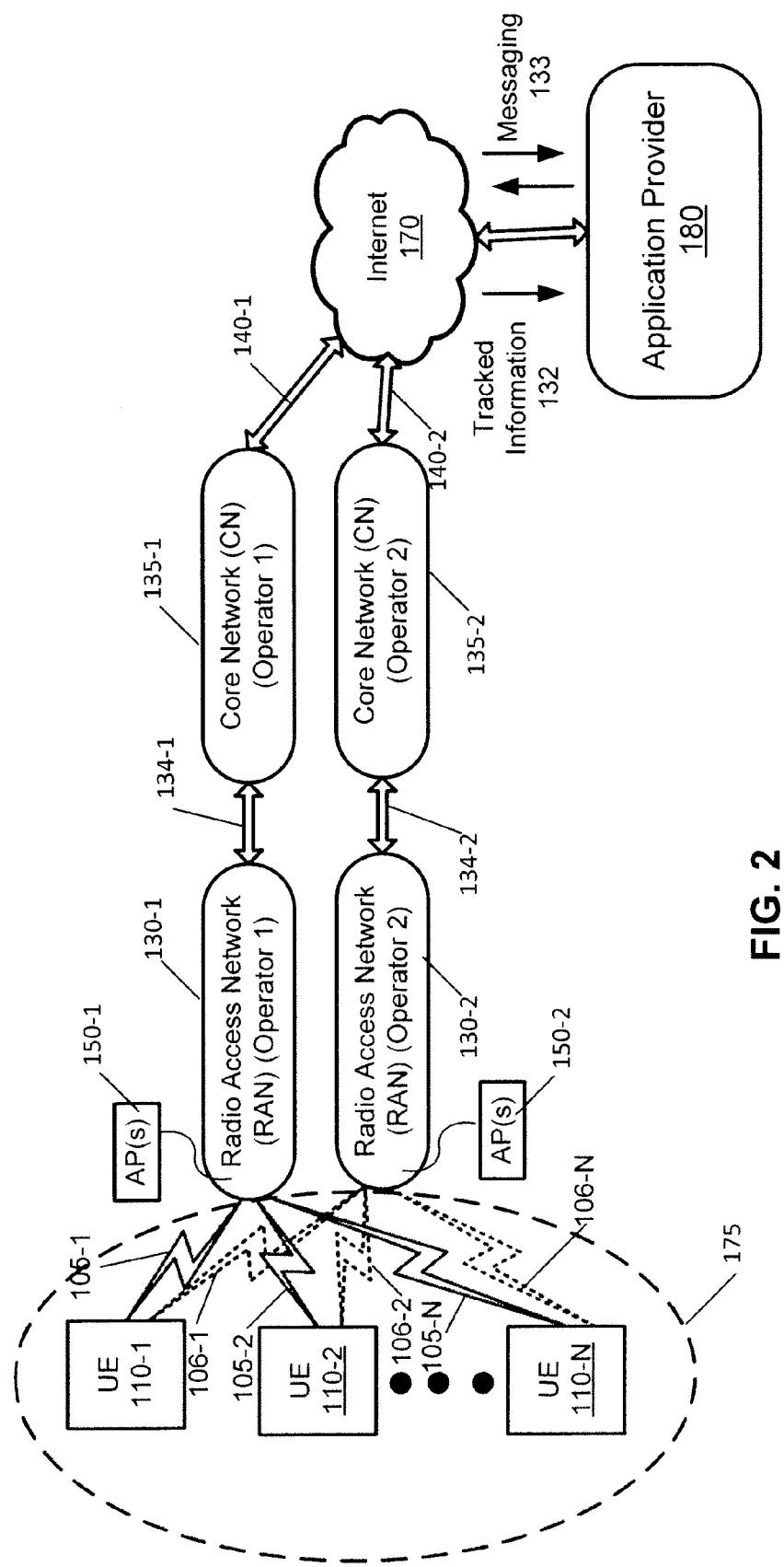
FIG. 2 illustrates a block diagram of the exemplary system of FIG. 1 after (in an example) an exemplary embodiment of the instant invention has been performed or during (in another example) an exemplary embodiment of the instant invention.

Turning to FIG. 2, a block diagram is shown after (in an example) an exemplary embodiment of the instant invention has been performed or during (in another example) an exemplary embodiment of the instant invention. In one example, the RAN 130-2 and the AP(s) 150-2 are not installed initially while the application provider 180 gathers tracked information 132. After some time period during which the tracked information 132 is gathered in the database 189 (see FIG. 1), the application provider 180 determines a number of advertising targets, e.g., selected users using geographic region 175, to which the application provider 180 judges suitable for sending messaging 133. The application provider 180 sends the messaging 133 to the selected users. Such messaging 133 may include advertisement(s) for upgraded wireless service in the geographic region 175. Based on certain criteria regarding, e.g., how many users are able to be transferred from Operator 1 to Operator 2, Operator 2 may put in a RAN 130-2 and corresponding one or more APs 150-2 and these may be connected via link 134-2 to the CN 135-2. The UEs 110 therefore have the option of also connecting to the RAN 130-2/APs 150-2 via wireless links 106.

In another exemplary embodiment, the RANs 130-1 and 130-2 operate to cover part or all of the geographic region 175 and coexist at the same time. The application provider 180 determines a number of advertising targets, e.g., selected users using geographic region 175, to which the application provider 180 judges suitable for sending messaging 133. The application provider 180 sends the messaging 133 to the selected users. Such messaging 133 may include advertisement(s) to attempt to convince the selected users to transfer from Operator 1 (for instance) to Operator 2, particularly based on tracked information 132 indicating that Operator 2 has a better wireless service in the geographic region 175.

Figure 3:
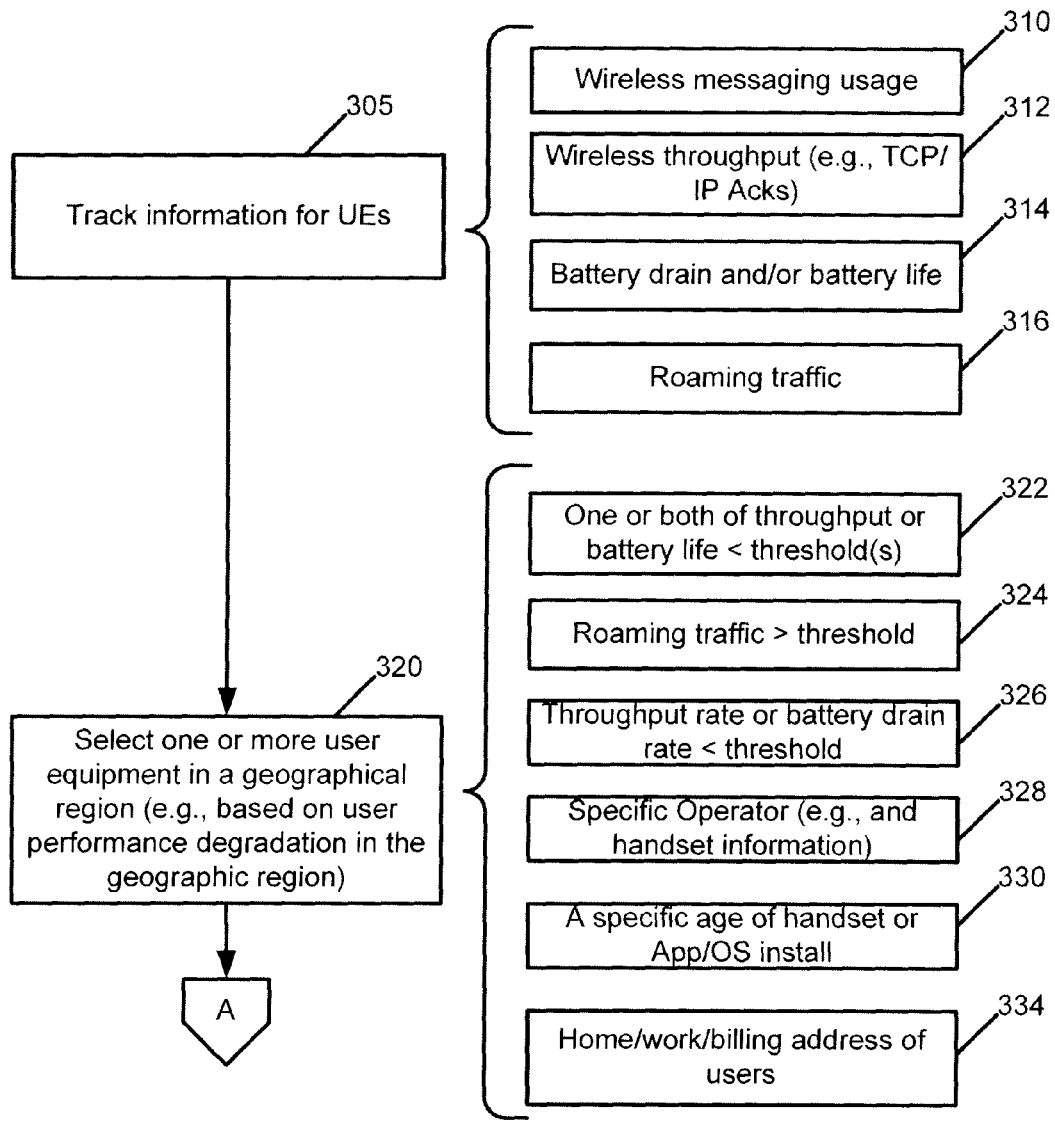
FIG. 3 is a block diagram of a flowchart of wireless service upgrade enablement.
Figure 3:
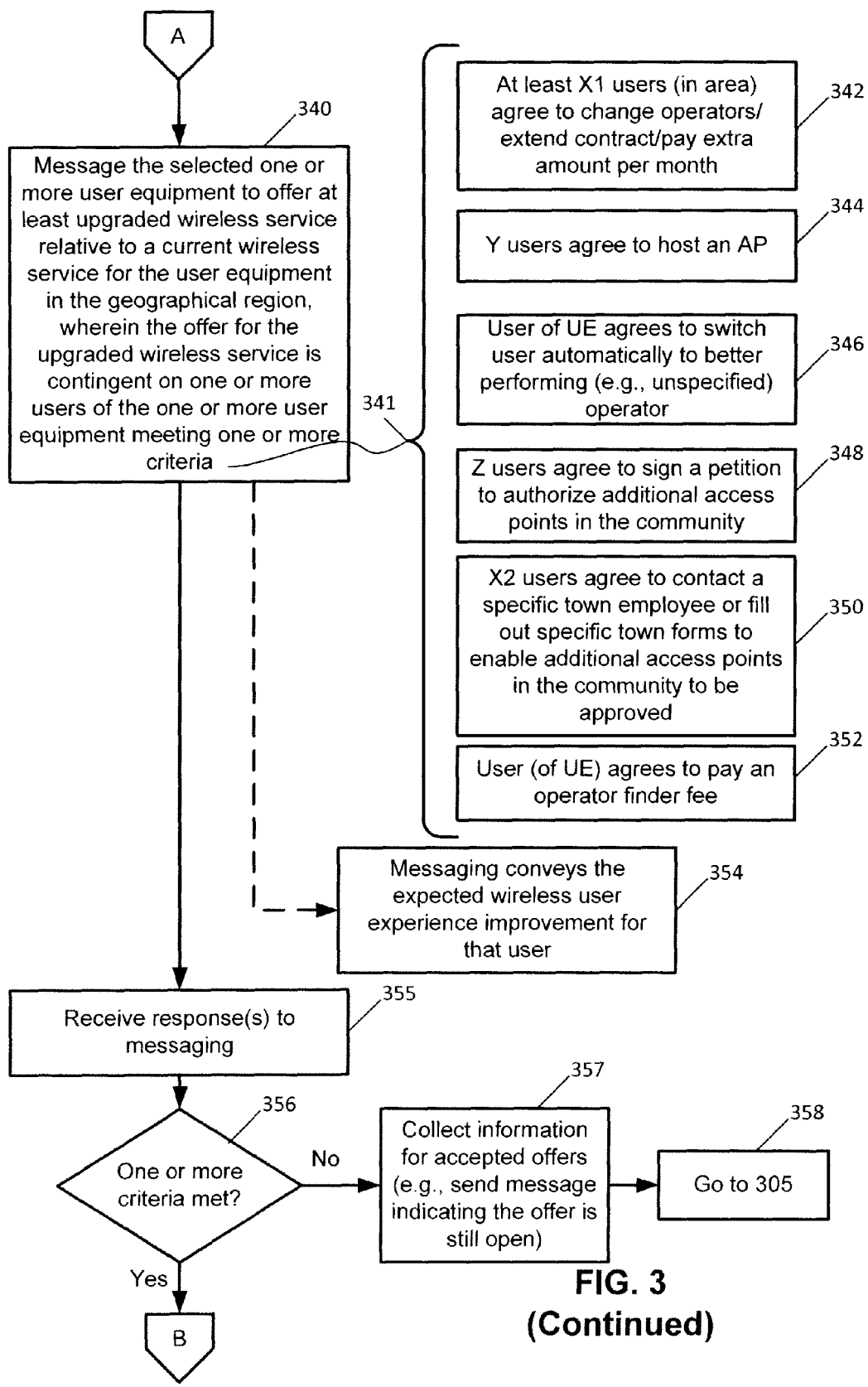
Figure 3:
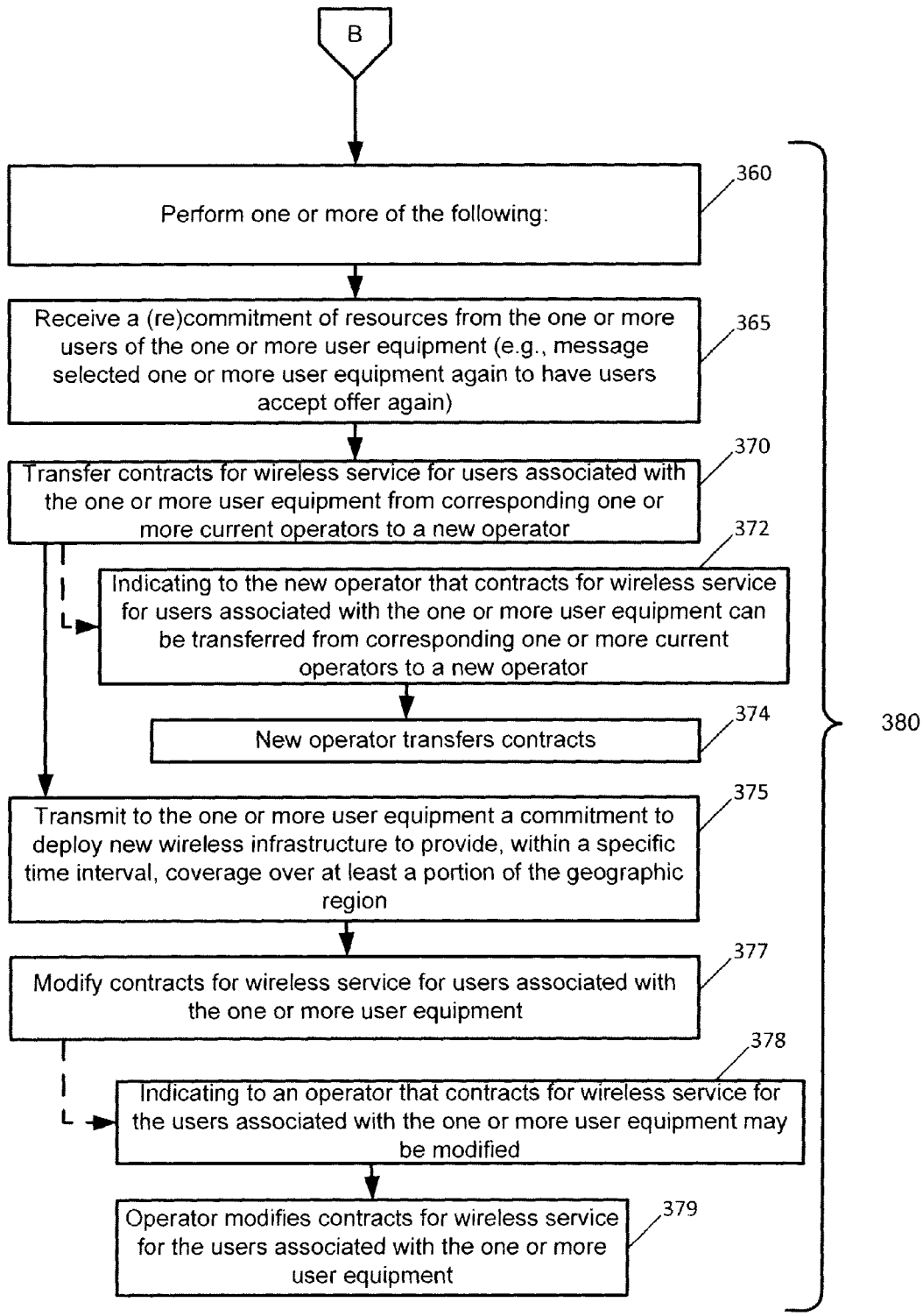

Turning now to FIG. 3, a block diagram is shown of a flowchart of wireless service upgrade enablement. The flowchart may be a method performed by, e.g., the application provider 180, may be a sequence of operations performed by computer program code (e.g., upgrade enabling application 186 as executed by the one or more processors 181), or may be a sequence of operations performed by hardware such as a logic circuit or integrated circuit.

In block 305, the application provider 180 tracks information for user equipment. It may be that the information for user equipment is tracked in a specific geographical region 175, or many geographical regions 175. Some examples of information that may be tracked include one or more of the following non-limiting information: wireless messaging usage 310 (e.g., usage by apps in the user equipment, as is done by NetMeter); wireless throughput 312 (e.g., which may be determined through, e.g., TCP/IP Acks, such as occur with video being downloaded by the user equipment, which may be determined by the server service application 188, and/or determined by estimating throughput based on UE locations); battery drain and/or battery life 314 of the user equipment (e.g., battery life may be monitored directly); or roaming traffic 316 (e.g., when the user equipment is inside the geographical region 175 but is serviced by a different operator than the operator associated with the user equipment).

In block 320, the application provider 180 selects one or more user equipment in a geographical region. As stated above, a particular geographical region 175 can be selected before block 320. Alternatively, a geographical region may be selected in block 320. In an example, the selection of the one or more user equipment (and the geographical region 175) may occur based on user performance degradation in the geographic region. For instance, the selection may be based on any one or more of the following. In block 322, a performance degradation may be determined in response to one or both of throughput or battery life being less than a threshold. In block 324, a performance degradation may be determined in response to roaming traffic being greater than a threshold. In block 326, a performance degradation may be determined in response to throughput or battery drain rate being less than threshold (possibly based on service type and/or usage). This targets peak users and can indicate the peak user is not receiving a suitable data rate.

In block 328, the one or more user equipment 110 (and/or the geographical region 175) is based on a specific operator associated with the user equipment 110 (or the geographical region 175), such as if the operator operates the RAN 130-1 and the user equipment 110 has service provided by the operator. Block 328 may also include handset information, such as the type of handset. The operator information may be useful, if an operator would like to target users in a particular geographical region 175 assigned to a competing operator. Handset information may also be useful, as the operator could use this information to target particular device types which are associated with higher margins for the operator or compatibility with the operator.

In block 330, the one or more user equipment 110 are selected using, e.g., a specific age of handset, specific applications (Apps) or a specific operation system (OS) installed. These may indicate user equipment whose user (and therefore the corresponding user equipment) is potentially nearing contract expiration. The geographical region 175 and corresponding user equipment 110 in that area may be selected responsive to one or more of home, work, and/or billing addresses of users (block 334). The server service application 188 may have access to such addresses. For both blocks 330 and 334, this information may be useful, e.g., if an operator would like to target users in a particular geographical region 175 assigned to a competing operator.

In block 340, the application provider 180 messages (e.g., via messaging 133) the selected one or more user equipment to offer at least upgraded wireless service relative to a current wireless service for the user equipment in the geographical region. The offer for the upgraded wireless service is contingent on one or more users of the one or more user equipment meeting one or more criteria. It is noted that messaging may be performed soon after user has a particularly poor quality experience, e.g., as determined by the upgrade enabling application 186.

The one or more criteria 341 may include but are not limited to the following non-limiting examples. In block 342, a criterion 341 is at least X1 users (in the geographical region 175) agree to change operators or extend their contract or pay an extra amount per month (or some combination thereof). For instance, a criterion 341 might be that X1 users switch operators and B years are added to each new contract and B' years are added to each new contract, and X1 multiplied by B plus B' should be greater than 1000. The message having this criterion 341 could be targeted to an area of a contiguous group of users with, e.g., throughput and/or battery drain rate below some threshold (e.g., possibly based on service type/usage, targeting peak users, e.g., as described above relative to block 326).

In another example, in block 344, a criterion 341 is that Y users agree to host an AP. That is, each of the Y users agrees to host an AP. This could provide an operator enough choices to find, e.g., the 10 best locations for the AP. Users may share additional wireless resources with existing subscribers, or may have no GB/mo (gigabyte per month) cap, free service for X months, or other incentives should a user agree to host an AP.

In a further example, in block 346, a criterion 341 is that a user of the user equipment agrees to switch the user automatically to a better performing (e.g., unspecified) operator. Another exemplary criterion 341 in block 348 is that Z users agree to sign a petition to authorize additional access points (APs) in the community. In block 350, a criterion 341 is that X2 users agree to contact a specific town employee or fill out specific town forms to enable additional access points in the community to be approved. Block 350 may include contacting any responsible person or entity for any potential area in a geographical region 175. In some areas, this may be a town and a person in a town (as recited in block 350). In other areas, this may be a county, township, state, municipality, and any corresponding entities suitable for authorizing additional access point(s) in that area.

Another exemplary criterion 341 is in block 352, where a user of the user equipment 110 agrees to pay an operator finder fee. This is an indication that with a competitor operator (in those locations, e.g., the geographical region 175), throughput or battery life or carbon footprint would improve, e.g., more than a threshold amount. Thus, the messaging 133 may include an offer to tell a user which operator is best for a price.

It is noted that each of the criteria 341 (shown in blocks 342, 244, 346, 348, 350, and 352) require some commitment of resources by the corresponding user(s). The commitment of resources could be money to be paid (e.g., blocks 342 and 352), performance of some action (e.g., blocks 348 and 350), or physical resources to be provided (e.g., block 344, where users agree to host an AP).

In another example, in block 340, the messaging 133 conveys (as illustrated by block 354), the expected wireless user experience improvement (e.g., in the geographical region 175) for that user. For instance, an X increase in throughput, or 4G is available (e.g., instead of only being in 3G), or battery life improves by Y percent in the geographical region 175 may be experienced. This message may be customized to that user's typical usage location and/or data usage pattern.

In block 355, response(s) to the messaging performed in block 340 are received. If the one or more criteria 341 are met (block 356=Yes), the flowchart proceeds to block 380. If the one or more criteria 341 are not met (block 356=No), in block 357, the upgrade enabling application 186 collects information for accepted offers. For instance, some of the criteria 341 require multiple users to accept the messaged offer. If the number of users has not been met (as per a criterion 341), then the upgrade enabling application 186 can collect the information that the user has accepted the offer. Block 357 may also include messaging to user(s) accepting the offer that the offer is still open (e.g., but more users also need to accept). Note that the upgrade enabling application 186 may also, after a predetermined time limit during which the criterion 341 are not met, message users that the offer is rescinded, e.g., due to the number of acceptances being lower than a threshold and/or some time period has elapsed. After block 357, the flowchart proceeds (as per block 358) to block 305.

Block 380 illustrates a number of different possibilities for additional processing. For instance, in block 360 (in response to the one or more users of the one or more user equipment meeting the one or more criteria, as indicated by block 356=Yes) then one or more of the blocks 365, 370, 375, and/or 377 are performed. In block 365, the application provider 180 (e.g., the upgrade enabling application 186) receives a (re)commitment of resources from the one or more users of the one or more user equipment. Such commitment includes any commitment associated with any one of the blocks 342, 344, 346, 348, 350, and 352 for the corresponding resources in the block. That is, in blocks 342, 344, 346, 348, 350, and 352, the users have already provided a commitment and block 365 provides an optional technique, e.g., in case it takes a while in order to meet the criteria 341, for the users to recommit to their original commitment. Block 365 also may provide messaging to the selected one or more user equipment to have users accept the offer again. That is, the users would recommit resources.

In block 370, contracts for wireless service for users associated with the one or more user equipment are transferred from corresponding one or more current operators to a new operator. Note that this block may be performed by the application provider 180 indicating to the new operator that contracts for wireless service for users associated with the one or more user equipment can be transferred from corresponding one or more current operators to a new operator (block 372), and the new operator would transfer the contracts (block 374). The application provider 180 itself may also perform block 370, without performing any indicating to the new operator. Block 370 applies at least to blocks 346 and 352, and may apply to the other blocks 342, 344, 348, and 350. For instance, in block 342 if the X1 users in an area (e.g., the geographical region 175) agree to change current operator(s) to a new operator. In block 344, if Y users agree to host an AP and the AP is operated by a new operator different from the current operator(s) of the users, then the users can be switched to the new operator.

In block 375, the application provider 180 transmits to the one or more user equipment a commitment to deploy new wireless infrastructure to provide, within a specific time interval, coverage over at least a portion of the geographic region. Block 375 is therefore applicable to any of the blocks 342, 344, 348, and 350. It is noted that this transmission to deploy new wireless resources may be conditional upon at least one of: a petition successfully obtaining physical hosting location for the aforementioned wireless infrastructure; or the one or more users committed to host the new wireless infrastructure pass a goodness of fit test, verifying that each corresponding location is sufficient for hosting the new wireless infrastructure.

In block 377, contracts for wireless service for users associated with the one or more user equipment are modified. This block may be performed by the application provider 180 indicating (block 378) to an operator that contracts for wireless service for users associated with the one or more user equipment may be modified, and the operator modifies the contracts (block 379). Alternatively, block 377 may be performed by the application provider 180 without performing the indicating to the operator. Block 377 may be used, e.g., if the X1 users extend their contract or agree to pay an extra amount per month.

Additional examples are as follows. A user can forward the offer to people, e.g., using an address book of the user where those people (Z2) have a particular attribute determined by messaging offer. The attribute can include at least one of (a) an indication of the number of credits towards the X &/or Y requirement for the group offer, e.g. based on the operator's estimate of the desirability of obtaining that new customer, e.g., based on the operators estimate of how good that customer would be (as determined for instance using RF history of the customer), or (b) an indication of the estimated performance improvement that user Z would achieve if the additional service was provided.

Further, a UE W can respond that the UE (e.g., user) is willing to agree to the offer, only if at least a threshold proportion of his or her "friends" will also agree to switch, e.g. potentially retrieved from social networking application or address book or recent call list or the like, and/or frequently called numbers (or those numbers having a high portion of minutes) also agreed to switch, e.g., in order to preserve mobile to mobile free calling for the frequently dialed numbers.

In another example, the offer may indicate the additional performance improvement to the user, and this indication also may includes a calculation of the effectiveness of a ProSe (proximity services) feature for that particular user based on location history of the user and/or the location history of friends/frequent messaging counterparts. For instance, in the case where switching to the new operator means switching to an operator who supports proximity services.

In a further example, messaging conveys the deadline by which user must act, in order to count towards the small cell offer and/or in order to receive a particular remuneration, such as minutes, a monetary incentive, QOS (quality of service)-based benefit (similar to the deadline by which one must act on a coupon offer) if that user accepts, or recommends a user who accepts.

An additional exemplary embodiment, users meeting criteria in blocks 342 and 344 identify consumers willing to subsidize deployment of equipment that will provide improved service to all subscribers not just the purchasers.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory 125, 184 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    selecting one or more user equipment based at least on tracked information related to quality of a wireless service for user equipment in a geographic region;
    messaging the selected one or more user equipment to offer at least upgraded wireless service relative to a current wireless service for the user equipment in the geographic region, wherein the offer for the upgraded wireless service is contingent on one or more users of the one or more user equipment meeting one or more criteria; and
    in response to the one or more users of the one or more user equipment meeting the one or more criteria, transmitting to the one or more user equipment a service provider commitment to deploy new wireless infrastructure to provide, within a specific time interval, coverage over at least a portion of the geographic region.

2. The method of claim 1, wherein the one or more users of the one or more user equipment meeting the one or more criteria comprise the one or more users providing an original commitment of resources from the one or more users of the one or more user equipment.

3. The method of claim 2, wherein a plurality of users corresponding to a plurality of user equipment must meet the one or more criteria and commit to the original commitment of resources in order for the transmitting of the service provider commitment to occur.

4. The method of claim 2, wherein the method further comprises, in response to the one or more users of the one or more user equipment meeting the one or more criteria, receiving an indication of the one or more users recommitting to the original commitment of resources.

5. The method of claim 1, wherein the one or more criteria comprise at least a certain number of users agree to host an access point, and wherein transmitting further comprises transmitting to the one or more user equipment associated with the certain number of users the service provider commitment to deploy new wireless infrastructure to provide, within the specific time interval, coverage over at least the portion of the geographic region.

6. The method of claim 1, wherein transmitting the service provider commitment to deploy new wireless infrastructure further comprises transmitting the service provider commitment to deploy new wireless resources conditional upon at least one of:
   a petition successfully obtaining physical hosting location for the new wireless infrastructure; and
   the one or more users committed to host the new wireless infrastructure pass a goodness of fit test, verifying that each corresponding location is sufficient for hosting the new wireless infrastructure.

7. The method of claim 1, wherein selecting further comprises selecting the one or more user equipment based at least on one or both of throughput or battery life for the selected one or more user equipment while in the geographic region not meeting associated thresholds.

8. The method of claim 1, wherein selecting further comprises selecting the one or more user equipment based at least on roaming traffic for the selected one or more user equipment while in the geographic region not meeting a threshold.

9. The method of claim 1, wherein selecting further comprises selecting the one or more user equipment based at least on a specific age of the user equipment for the selected one or more user equipment and the geographical region is a selected geographical region.

10. The method of claim 1, wherein selecting further comprises selecting the one or more user equipment based at least on one or both of an application or an operating system installation on the selected one or more user equipment and the geographical region is a selected geographical region.

11. The method of claim 1, wherein the tracked information comprises one or more of the following: wireless messaging usage; wireless throughput; battery drain; battery life; or roaming traffic.

12. The method of claim 1, wherein messaging further comprises conveying via the messaging an expected improvement in wireless user experience for at least a selected one of the one or more user equipment.

13. The method of claim 1, wherein selecting further comprises selecting the one or more user equipment based at least on addresses of users associated with the one or more user equipment and the geographical region is a selected geographical region.

14. A method according to claim 1, wherein the tracked information is obtained by a server service application from a client service application through an Internet connection, wherein the client service application operates on the one or more user equipment, the server service application operates on an Internet-based application provider that is independent from the operator of the wireless service, and the tracked information is transmitted from the client service application to the server service application via a connection that includes the wireless service and the Internet connection.

15. An apparatus, comprising:
   one or more processors; and
   one or more memories including computer program code,
   the one or more memories and the computer program code configured, with the one or more processors, to cause the apparatus to perform at least the following:
   selecting one or more user equipment based at least on tracked information related to quality of a wireless service for user equipment in a geographic region;
   messaging the selected one or more user equipment to offer at least upgraded wireless service relative to a current wireless service for the user equipment in the geographic region, wherein the offer for the upgraded wireless service is contingent on one or more users of the one or more user equipment meeting one or more criteria; and
   in response to the one or more users of the one or more user equipment meeting the one or more criteria, transmitting to the one or more user equipment a service provider commitment to deploy new wireless infrastructure to provide, within a specific time interval, coverage over at least a portion of the geographic region.

16. A computer program product comprising a non-transitory computer-readable storage medium bearing computer program code embodied therein for use with a computer, the computer program code comprising:
   code selecting one or more user equipment based at least on tracked information related to quality of a wireless service for user equipment in a geographic region;
   code for messaging the selected one or more user equipment to offer at least upgraded wireless service relative to a current wireless service for the user equipment in the geographic region, wherein the offer for the upgraded wireless service is contingent on one or more users of the one or more user equipment meeting one or more criteria; and
   code responsive to the one or more users of the one or more user equipment meeting the one or more criteria, for transmitting to the one or more user equipment a service provider commitment to deploy new wireless infrastructure to provide, within a specific time interval, coverage/ over at least a portion of the geographic region.

* * * * *